June 19, 1962     L. B. DE VRIES     3,039,110
ANTI-BLINDING DEVICE
Filed Dec. 22, 1958
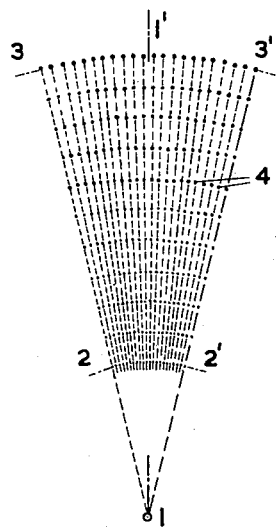
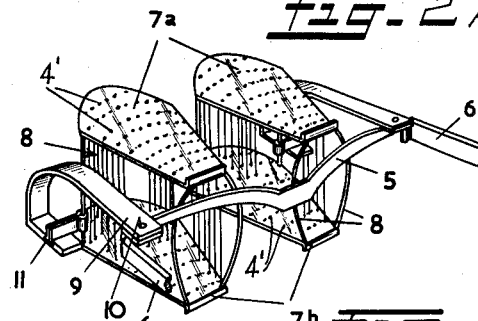
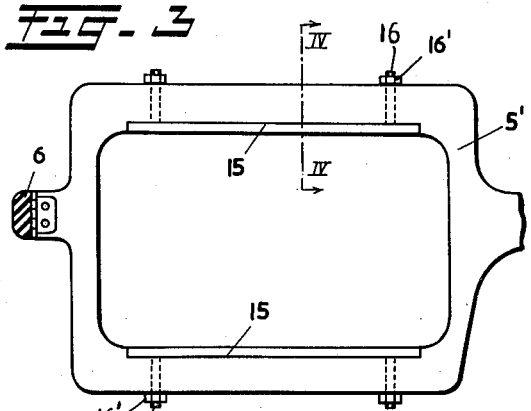
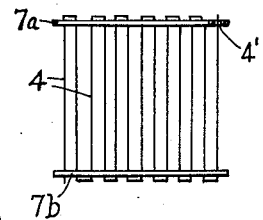
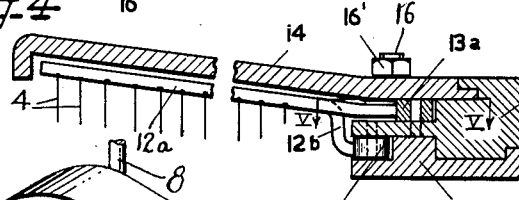
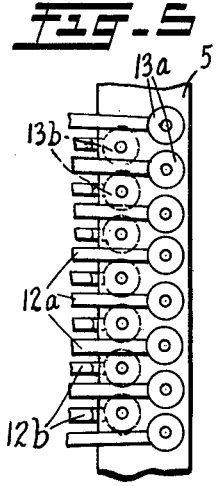
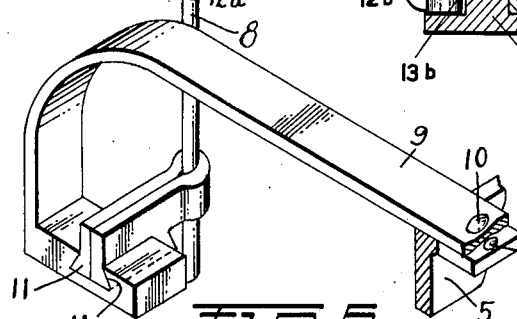
INVENTOR:
Lazarus B. DE VRIES
BY:
Wenderoth, Lind & Ponack
Attys United States Patent Office 3,039,110
Patented June 19, 1962

3,039,110
ANTI-BLINDING DEVICE
Lazarus B. de Vries, P.O. Box 689,
Amsterdam, Netherlands
Filed Dec. 22, 1958, Ser. No. 782,288
Claims priority, application Netherlands Jan. 7, 1958
8 Claims. (Cl. 2—14)

The invention relates to a light shielding device intended to protect road-users from being blinded by the lights of oncoming traffic. The object of the invention is to provide a device, which screens such oncoming lights efficiently.

The invention is based upon the principle, that in a regular arrangement in rows of parallel bar-shaped elements (as e.g. is the case in a regularly planted orchard) there are only a few definite preferential directions in which it is possible to see practically unhampered through such an arrangement.

The device according to the invention is characterized by opaque or substantially opaque threads stretched in the field of vision of each eye and arranged in rows, which rows when extended intersect one another in a point on the axis of the eye at a finite or infinite distance behind the eye. The device according to the invention is preferably attached to a spectacle frame.

According to the invention the device may be so formed that each half of the spectacle frame is provided with an upper and a lower thread-holder, provided with perforations in a pattern conforming to the desired arrangement of the rows of threads, through which perforations the threads are laced.

According to the invention the device may also be so formed, that each half of the frame is provided with an upper and a lower series of thread-holders in the form of rods each meant for one row of threads, which rods at the ends situated nearest to the eye are hinged to the spectacle frame and that, with the help of a separate comb, the teeth of which can be inserted between the rods of the upper as well as of the lower series, these rods can be turned in such a way, that the point of intersection of the rows of threads is displaced along and/or transversely to the axis of the eye.

Finally the device according to the invention may be formed in such a manner, that the pivots of the rods can be moved perpendicularly to the axis of the eye, the ends of the rods, which ends extend beyond the pivots being movable parallel to the axis of the eye by means of a pin and slot connection and that by means of a comb-shaped member attached to the spectacle frame and having oblique teeth situated between the pivots, these pivots can be moved sideways, so that the point of intersection of the rows of threads is displaced along and/or transversely to the axis of the eye.

The invention will be elucidated with reference to the accompanying drawing showing some embodiments of the device according to the invention.

In said drawing:

FIGURE 1 is a plan view of a thread-pattern, according to the invention;

FIGURE 2A is a simplified perspective showing of a first embodiment according to the invention;

FIG. 2B is a schematic cross-section through the device of FIG. 2A, showing the manner in which the threads are fastened;

FIGURE 3 is a rear view of a portion of a second embodiment according to the invention;

FIGURE 4 is a sectional view on line IV—IV of FIGURE 3 showing the thread-holders and the protection-cap;

FIG. 5 is a sectional view along line V—V of FIG. 4, showing the location of the thread-holders and their pivots;

FIG. 6 is an enlarged perspective view of a thread holder support and a clamp therefor.

In FIGURE 1 the principle upon which the invention is based, is made clear. The axis of the eye is represented by the line 1—1'. Perpendicular to the plane of the drawing 11 rows of 22 threads 4 in each row are stretched in rows, the extensions of which intersect each other in the point 1. The arches 2—2' and 3—3' which connect the terminal points of the rows of threads, are shown here as being circular, but they can also be of a different form, depending upon the requirements. Such an arrangement of threads is situated before each eye.

The eye is located between the inner arch 2—2' and the point 1. Incident light directed towards the eye will be intercepted by the threads, and this effect will be increased when, as seen in the direction of incidence, the number of threads in the field of vision increases. The center 1 is chosen in such a manner, that this interception of light is maximum in the direction desired, e.g. that of the oncoming traffic for an average width of road and for distances over which the blinding effect of lamps is strongest. On the other hand in the user's own direction of observation the threads should be practically in one line, so that they will intercept a minimum of light. The positioning of point 1 is therefore to be adapted to the light conditions desired. In the first embodiment, this positioning is permanent and this embodiment, therefore, should be adapted to the average values of the distances in question; in a second embodiment, this positioning is changeable, so that the user can adjust the device according to requirements.

FIGS. 2A and 2B schematically illustrate a first embodiment according to the invention. The collection of threads is fixed here to a spectacle frame 5, the nose-supports of which are not shown and which is provided with ear-pieces 6. To the frame two upper thread-holders 7a and two lower thread-holders 7b are attached. These thread-holders are interconnected by uprights 8. The threads 4, shown in FIG. 2B, are alternately passed through apertures 4', alternately in the upper and lower thread-holder, said apertures being drilled according to the desired arrangement of threads. The threads are made e.g. of nylon yarn, which preferably is colored black. The upper thread-holders 7a moreover give protection against the light which is reflected by the rear view mirror of a motor car.

This screening can be improved upon further by providing the thread-holders on the side directed towards the frame with an upright edge, as illustrated; this edge also adds to the rigidity and thus to the safety. The thread-holders are preferably made from light synthetic resins.

Each of both sets of thread-holders 7a—7b is kept in place by a support 9. These supports are hinged to the frame by pivot 10 on the spectacle frame 5 (which in FIG. 6 has been partially cut away for clarity). The supports 9 may be locked in the extended position by means of detents (not shown) on the end of supports 9 which engage in depressions 10a on the spectacle frame 5. Clamp 11 is a strap which wraps around and engages one of the uprights 8 connecting the thread holders 7a and 7b. At the free end of each support 9 is a dovetail-shaped locking groove 11a into which the dovetail edge of clamp 11 is slidably engaged for tightly engaging the upright 8 and locking the clamp therearound. The two sets of thread-holders may then be slid transversely of the corresponding eye axis, so that these sets may be adapted to the eye-distance of the user. To allow for a displacement of the respective points of intersection 1

(FIG. 1), the pivots 10 may be made slidable parallel to the eye axis (i.e. parallel to the vertical symmetry plane of the device). It is to be understood, however, that the mentioned sliding directions may be interchanged, and that said sliding connections may be provided with a suitable locking means to keep the sets of thread-holders in a given position. Clamps 11 are preferably disengageable; the two sets may then be taken apart and the supports 9 be turned inwardly, so that the device when not used, may be reduced to a more compact form. The two sets of thread-holders may further be made collapsible by a suitable construction of the uprights 8, e.g. by providing pivots in their connection with the two holders 7a and 7b, or by other suitable means that allow the sets to be collapsed without damaging the threads.

In FIGURES 3–5 a second embodiment according to the invention is illustrated. To the frame 5' (see FIGURE 4) at the upper as well as at the lower side of each half of the frame a series of thread-holders 12a and 12b are so fixed as to be pivotable about the pins 13a and 13b. As appears from FIGURES 4 and 5 these pins 13a and 13b are fixed alternately in different planes and at different distances from the rear of frame 5', because the distances between the rows of threads adjacent the pins is too small to place all of said pins one next to the other.

FIGURE 4 is a cross-section on the line IV—IV of FIGURE 3. The thread-holders are formed here as oblong rods, each two rods being for one row of threads. The thread-holders are protected on the upper and on the lower side by a protecting-plate 14, which can be slid into a groove of the frame 5'. Together with a clamping plate 15 and with the aid of nuts 16 on bolts 16' the thread-holders are kept in a fixed position. FIG. 5 is a partial cross-section along line V—V of FIG. 4 and shows the relative position of the thread-holders and their pivots.

By turning the thread-holders 12a and 12b through an appropriate angle, the center 1 can be displaced along and/or transversely to the axis of the eye. This can be effected by means of a comb, the teeth of which, after removal of the protecting-plates 14, can be placed between the thread-holders, these teeth being long enough to serve the upper as well as the lower series. By moving the comb forwards the thread-holders are turned in such way as to displace the center 1 backwards, and vice versa; through a lateral displacement an opposite lateral displacement can be given to the point 1. With this device, the user of the spectacles can adjust the point of the threads to a position which under the given circumstances is most favorable.

In the latter embodiment, the threads should be so stretched about the thread-holders as to be prevented from shifting relative to said holders. This can be effected e.g. by providing these thread-holders with suitable grooves, projections or indentations, through which, or along which the threads are laid; these grooves can be so arranged that the threads will be clamped therein, while the tension given to the threads is maintained.

I claim:
1. A light-shielding device to be placed in the field of vision of an observer, comprising a frame, two sets of light-shielding elements, one for each eye of the observer, each set consisting of a plurality of parallel substantially opaque threads, said threads being arranged in parallel groups situated in a plurality of substantially vertical planes, said planes intersecting in a common line behind said frame, upper and lower supporting means between which said threads are stretched, and connecting means connecting said sets to said frame in side-by-side relationship.

2. A light-shielding device according to claim 1, in which said frame is a spectacle frame.

3. A light-shielding device, comprising a spectacle frame with a pair of ear pieces thereon, two pairs of thread-holders in the form of plates, each pair having two plates spaced at a fixed vertical distance and being provided with a pattern of perforations, at least one thread being laced alternatively through a perforation of an upper and a lower plate, said perforations of each plate being arranged in rows converging substantially toward one point, the patterns in all of said plates being substantially identical, and a pair of connecting members, each being connected at one end to said spectacle frame and at the other end to the corresponding pair of spaced plates.

4. A light-shielding device, comprising a spectacle frame with a pair of ear pieces thereon, two pairs of thread-holders in the form of plates, each pair having two plates spaced at a fixed vertical distance and being provided with a pattern of perforations, at least one thread being laced alternatively through a perforation of an upper and a lower plate, said perforations of each plate being arranged in rows converging substantially toward one point, the patterns in all of said plates being substantially identical, a pair of connecting members, fastening means connected to one end of each connecting member and to the spectacle frame, fastening means connected to the other end of each connecting member and to the corresponding pair of spaced plates, the fastening means at one end of said connecting member being slidably mounted on said spectacle frame for movement horizontally and parallel to the spectacle frame and the fastening means at the other end of said connecting member being slidably connected to said spaced plates for movement transversely of said frame, and locking means for fixing said fastening means in a given position.

5. A light-shielding device according to claim 4, in which each fastening means at said spectacle frame additionally includes a pivot with substantially vertical axis, the locking means also locking the corresponding connecting element against rotation in a given position.

6. A light-shielding device, comprising a spectacle frame with a pair of ear pieces thereon, each eye opening of which is provided with an upper and a lower rim, both being substantially horizontal, a plurality of rod-shaped thread supporting elements, separate pivots on said rims, each rod-shaped supporting element being rotatably mounted on a separate pivot on said rims and extending outwardly from said spectacle frame so as to form at each eye-opening an upper and a lower set of thread-supporting elements, at least one thread being laced between each corresponding pair of elements of an upper and lower set, an upper protection plate above each upper set of elements and clamping means clamping each upper plate on the corresponding upper rim, and a lower protection plate below each lower set of elements and clamping means clamping each lower plate on the corresponding lower rim, said protection plates upon being clamped on the associated rim, locking the corresponding set of elements in a given position.

7. A light shielding device, comprising a spectacle frame with a pair of ear pieces thereon, two pairs of thread-holders in the form of plates, each pair having two plates spaced at a fixed vertical distance and being provided with a pattern of perforations, at least one thread being laced alternatively through a perforation of an upper and a lower plate, said perforations of each plate being arranged in rows converging substantially toward one point, the patterns in all of said plates being substantially identical, a pair of support members, hinges connected to one end of each support member and to the spectacle frame, clamps connected to the other end of each support member and to the corresponding pair of spaced plates, the hinges at one end of said support member slidably mounted on said spectacle frame for movement horizontally and parallel to the spectacle frame and the clamps at the other end of said support member being slidably connected to said spaced plates for movement parallel with said frame, and locking means for fixing said slidable connections in a given position.

8. A light shielding device, comprising a spectacle frame with a pair of ear pieces thereon, two pairs of thread-holders in the form of plates, each pair having two plates spaced at a fixed vertical distance and being provided with a pattern of perforations, at least one thread being laced alternatively through a perforation of an upper and a lower plate, said perforations of each plate being arranged in rows converging substantially toward one point, the patterns in all of said plates being substantially identical, a pair of support members, hinges connected to one end of each support member and to the spectacle frame, clamps connected to the other end of each support member and to the corresponding pair of spaced plates, the clamps at the other end of said support member being slidably connected to said spaced plates for movement parallel with said frame, and locking means for fixing said slidable connections in a given position.

References Cited in the file of this patent

UNITED STATES PATENTS

| | | |
|---|---|---|
| 1,089,539 | Driver | Mar. 10, 1914 |
| 1,605,418 | Wittkopf | Nov. 2, 1926 |
| 2,032,101 | Sullivan | Feb. 25, 1936 |
| 2,114,658 | Noffsinger | Apr. 19, 1938 |
| 2,362,597 | Vince | Nov. 14, 1944 |
| 2,824,308 | Duncan | Feb. 25, 1958 |

FOREIGN PATENTS

| | | |
|---|---|---|
| 119,784 | Great Britain | Apr. 9, 1926 |
| 622,302 | Great Britain | Apr. 29, 1949 |